United States Patent [19]

Dennison

[11] 4,400,025

[45] Aug. 23, 1983

[54] LEADER-TYING VISE DEVICE

[76] Inventor: Robert R. Dennison, 2220 SW. Troy, Portland, Oreg. 97219

[21] Appl. No.: 211,190

[22] Filed: Nov. 28, 1980

[51] Int. Cl.³ ............................................... D03J 3/00
[52] U.S. Cl. ................................................... 289/17
[58] Field of Search ......................................... 289/17

[56] References Cited

U.S. PATENT DOCUMENTS

| | | | |
|---|---|---|---|
| 2,469,037 | 5/1949 | Harvey | 289/17 |
| 2,488,414 | 11/1949 | King | 289/17 X |
| 2,498,920 | 2/1950 | Holland | 289/17 |
| 2,502,751 | 4/1950 | Roberts | 289/17 |
| 2,773,713 | 12/1956 | Smalley | 289/17 |
| 3,713,680 | 1/1973 | Pagano | 289/17 |
| 3,787,081 | 1/1974 | Macy | 289/17 |

Primary Examiner—Louis Rimrodt

Attorney, Agent, or Firm—Kolisch, Hartwell & Dickinson

[57] ABSTRACT

A hand-held vise device for holding the ends of lines to facilitate tying them together. It includes a U-shaped base formed of a pair of similarly profiled U-shaped plates, disposed with one overlying the other. The base includes a pair of leg portions interconnected by a web portion. Each leg portion has an associated lever extending generally along its length with one end of the lever adjacent the distal end of the leg portion. Vise tension is provided by an elastomer expanse encircling each leg portion and its associated lever, urging the lever's one end toward the distal end of the leg portion. Each elastomer expanse has joined to it a pad expanse interposed between the distal end of a leg portion and an end of a lever.

8 Claims, 6 Drawing Figures

LEADER-TYING VISE DEVICE

BACKGROUND AND SUMMARY OF THE INVENTION

This invention pertains to a vise device for holding the ends of lines to facilitate tying them together. More specifically, it pertains to a hand-held vise device for holding ends of monofilament fishing lines for use in tying tapered leaders.

This device, in its preferred embodiment, is used to hold the ends of two fishing leaders for tying them together. A tapered leader is produced by tying together several sections of leaders having consecutively larger or smaller diameters. Although the preferred embodiment is intended for use with fishing leaders, it may equally well be applied to other types of lines.

Monofilament leader is typically tied either manually or by use of a tying device similar to that disclosed in U.S. Pat. No. 2,773,713. As many fisherman will attest, manual tying of leader can be both difficult and frustrating due to the awkwardness of manipulating such fine line by hand.

A conventional tying device similar to the one disclosed in the cited patent has a thick U-shaped body or base made of rigid plastic or metal. Levers associated with leg portions in the base pivot about screw necks and are subject to wear. Movement is resisted by friction. A certain amount of care is necessary to place lines within small grooves provided in the body for seating the lines. An elongate tool may be used in tying lines held together on the body of the device, but there is no provision for storing the tool within the body of the device.

It is therefore a general object of this invention to provide a leader-tying vise device which overcomes the problems existing in the prior art.

Specifically, it is an object of this invention to provide such a device which is easier to use, has a lighter weight, and is of a slimmer design.

It is a further object to provide such a device which has a reduced manufacturing cost and is easier to assemble as compared to conventional leader-tying devices.

It is also an object of this invention to provide a device which is relatively maintenance-free. Further, means is provided for storing an elongate tool which is used during the tying operation.

To this end, a preferred embodiment of this invention is proposed which includes a base formed of a pair of similarly-profiled U-shaped plates, each having two spaced-apart leg expanses and a connecting web expanse. Each pair of leg expanses has an associated lever extending generally parallel with the pair of leg expanses with one end of the lever adjacent the distal ends of the pair of leg expanses. Vise tension is provided by an elastomer expanse for each lever encircling each pair of leg expanses and an associated lever. The web expanses of the two plates are cooperatively shaped to define a channel for holding an elongate tool.

It can be seen that a device made in accordance with this invention will satisfy the various objectives proposed. The use of two plates for a base provides a slimmer design and is lighter in weight than prior art devices when made of comparable material. Since the parts are held in place simply by an elastomer expanse and there are fewer parts, assembly is easier and faster. Thus, the cost of manufacturing is reduced. Having fewer parts and a minimum of friction in use, the device is relatively maintenance-free. The positioning of lines in the device is simplified since all of the space between the lever and the pad expanse can be used. The continuous force applied by the elastomer expanse holds the tool in the channel between the plates even after some wear has occurred.

These and other objects and features of the present invention will now be more fully described with reference to the following detailed description of a preferred embodiment of the invention and the accompanying drawings.

DETAILED DESCRIPTION OF THE INVENTION

Figure 1:
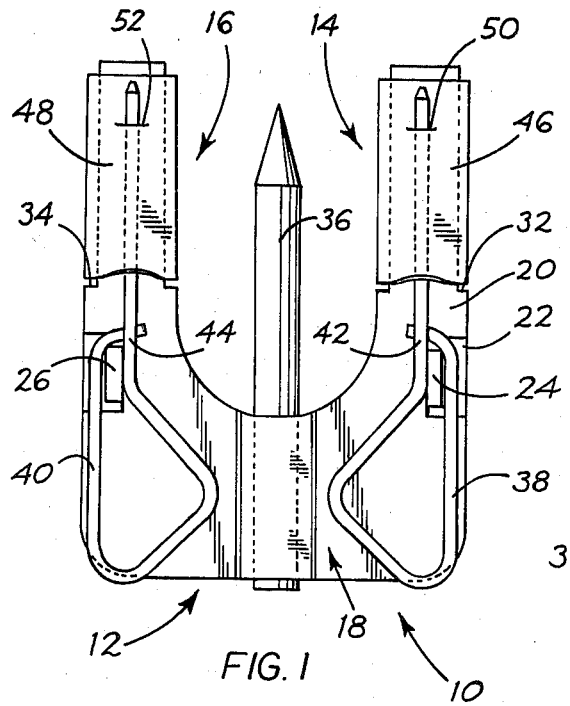
FIG. 1 is a plan view of a leader-tying vise device constructed according to a preferred embodiment of the present invention.
Figures 3, 4:
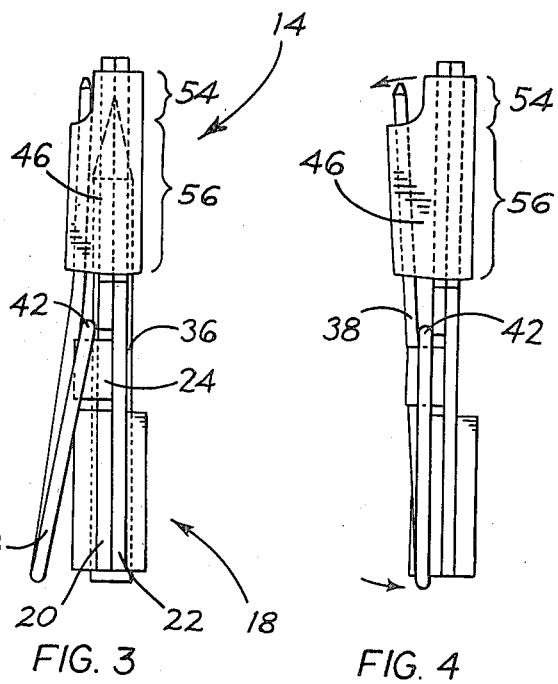
FIG. 3 is a side elevation view taken from the right side of FIG. 1.
FIG. 4 shows a side elevation similar to FIG. 3 except that the pointed tool has been removed and the levers are in a position ready for receipt of lines for tying.
Figure 2:
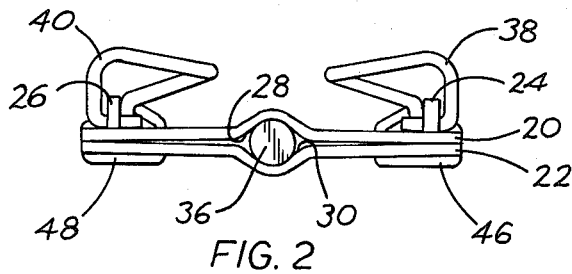
FIG. 2 is a side elevation view taken from the bottom of FIG. 1.

Turning now to the drawings, specifically FIGS. 1-3, a vise device made in accordance with this invention is shown generally at 10. Shown at 12 is a U-shaped base having two leg portions 14, 16 and a connecting web 18. Base 12 includes two U-shaped plates, upper plate 20 and lower plate 22. Plates 20, 22 have similar profiles as shown in FIG. 1. Thus, upper plate 20 has a leg expanse forming the upper part of leg 14 overlying a similar leg expanse in plate 22 and another leg expanse forming the upper part of leg 16 overlying a similar leg expanse in plate of 22. A web expanse in plate 20 forms the upper part of web 18 and overlies a similar web expanse in plate 22. A pair of lugs 24, 26, on plate 20 which project upwardly away from plate 22.

Plates 20, 22, in their web expanses, have opposing grooves 28, 30, which cooperate to form a channel extending transversely through web 18 in a direction generally parallel with leg portions 14, 16. An elongate tool 36, shown as a pointed rod with a diameter greater than the diameter of the channel, is fitted in the channel.

The ends of leg portions 14, 16 above points 32, 34 as shown in FIG. 1, are of a narrower width than the ends of the leg portions which connect to web 18.

Associated with and extending generally along the length of leg portions 14, 16 are elongate metallic levers 38, 40. One end of each of levers 38, 40 is adjacent the distal end of leg portions 14, 16, respectively. Each lever is formed of an elongate piece of wire which is looped to provide a handle at the opposite end of the lever which overlies web 18. The wire after forming the handle continues to an end which is turned under an intermediate portion in the wire forming the lever, shown in the case of lever 38 at 42, and in the case of lever 40 at 44. Such turned under ends provide projecting fulcrums in the lever which pivotally support the lever. Levers 38, 40 are shaped to receive lugs 24, 26 as shown in FIG. 1.

According to an important feature of this invention, elastomer sleeves 46, 48 encircle leg portions 14, 16 above points 32, 34 in FIG. 1 and levers 38, 40, respectively. Sleeves 46, 48 have openings 50, 52, respectively, through which the ends of levers 38, 40 extend. Openings 50, 52 may be thought of as dividing sleeves 46, 48, respectively, into two sections. The sections interposed between the ends of levers 38, 40 and the distal ends of leg portions 14, 16, respectively, are referred to herein as pad expanses, exemplified by pad expanse 54 in sleeve 46. The remaining portions, each of which encircle both a lever and its associated leg portion are referred to herein as elastomer expanses, 56, 57.

Explaining the operation of device 10, FIG. 3 illustrates what may be thought of as the stable state in which elastomer expanse 56 presses the upper end of lever 38 against pad expanse 54. By displacing the other or handle end of lever 38 toward base 12, as shown by the lower arrow in FIG. 4, lever 38 pivots on fulcrum 42 causing the upper end to move away from base 12 (upper arrow in FIG. 4), thereby stretching elastomer expanse 56. This separates the upper end of lever 38 associated with the distal end of leg portion 14 from pad expanse 54 providing a space for inserting the ends of lines or leaders to be tied. After such lines have been inserted, the handle end of lever 38 may be released, permitting the upper end of lever 38 to press the lines against pad expanse 54. The same method of operation applies to lever 40.

Figure 5:
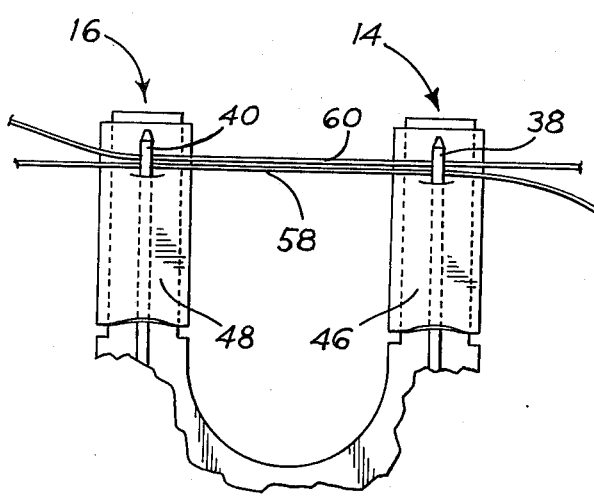
FIG. 5 is a fragmentary plan view similar to FIG. 1 showing the location of lines inserted in the vise device in a position ready for tying.

FIG. 5 illustrates in a fragmentary view of device 10 the position of two leaders 58, 60 after such have been inserted according to the steps just described. Tool 36 is removed from device 10 and inserted between leaders 58, 60 at a point between leg portions 14, 16. It is then rotated end over end approximately three or four times, depending on the size of leaders 58, 60. The smaller the diameter of the leaders the more turns required to make an effective knot.

Figure 6:
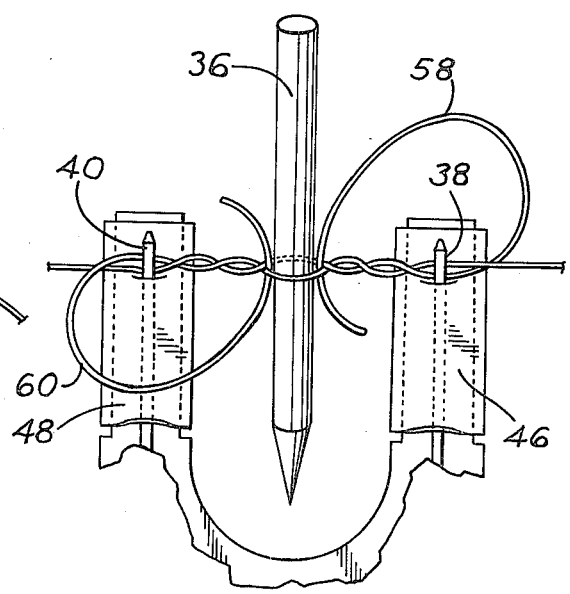
FIG. 6 is also a fragmentary plan view similar to FIG. 5 but further shows the position of the pointed tool after it has been used to prepare a knot joining two leaders.

FIG. 6 shows the position of tool 36 after it has been rotated as just described. The ends of leaders 58, 60 are inserted oppositely through the gap in the leaders through which tool 36 extends. Tool 36 is removed and the ends of leaders 58, 60 are pulled to tighten the knot. The tightening process may be simplified by removing leaders 58, 60 from device 10 and inserting both loose ends of leaders 58, 60 together between the end of one of the levers and its associated pad expanse. Both hands may then be used to simultaneously pull on each main strand of leaders 58, 60.

It can be seen that a leader-tying vise device made in accordance with this invention, such as the preferred embodiment just-described, satisfies the specified objectives. The slim design coupled with construction out of aluminum or similar alloys provides a lightweight device. The design minimizes rotational connections between parts so wear and friction are substantially reduced. Use of the elastomer sleeve and its associated elastomer-expanse and pad-expanse portions perform several functions. These include holding the plates together for gripping the elongate tool, providing a position for inserting and holding the lines to be tied, as well as providing vise tension for the levers. This construction can be seen to facilitate assembly and manufacture as well as provide relatively maintenance-free operation.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to secure by Letters Patent:
1. A vise device for holding ends of lines to facilitate tying them together comprising
a U-shaped base having two spaced-apart leg portions and a connecting web,
a lever associated with each leg portion extending generally along the length of the leg portion, pivotally supported between its ends on the leg portion, and having one end adjacent the distal end of the leg portion and an opposite depressible end which is spared from said base, and
an elastomer expanse for each lever snugly encircling the lever and the lever's associated leg portion in a region located between where the lever is pivotally supported and the lever's said one end and operable resiliently to urge said one end of the lever toward the distal end of the leg portion.
2. The device of claim 1, wherein said base includes a pair of U-shaped plates having similar profiles disposed with one overlying the other, each plate having a pair of leg expanses and the leg expanses of one plate overlying and being adjacent respective leg expanses of the other plate to form the leg portions of said base and each plate having an interconnecting web expanse and the web expanse of one plate overlying the web expanse of the other plate and the web expanses forming the web of said base, the web expanses being shaped to define therebetween a channel, and which device further includes an elongate tool fitted in said channel.
3. The device of claim 1, wherein each elastomer expanse for a lever is joined to a pad expanse which is interposed between the lever's said one end and the distal end of the leg portion associated with the lever.
4. The device of claim 1, wherein each lever is an elongate metallic element and includes intermediate its ends a projecting fulcrum which pivotally supports the lever.
5. A vise device for holding ends of lines to facilitate tying them together comprising
a pair of similarly profiled U-shaped plates, each having two spaced-apart leg expanses and a connecting web expanse, disposed with one plate overlying the other and with each leg expanse of one plate disposed adjacent a leg expanse of the other plate, said web expanses being shaped to define a channel extending therebetween, said plates forming a base for said device,
an elongate tool fitted in said channel, and
an elastomer expanse snugly encircling each pair of adjacent leg expanses and operable to hold said plates together.
6. The device of claim 5 which further includes a lever associated with each pair of leg expanses extending generally along the length of the pair of leg expanses, pivotally supported between its ends on the pair of leg expanses, having one end adjacent the distal ends of the pair of leg expanses, and encircled by said elastomer expanse which encircles the pair of leg expanses.
7. The device of claim 6, wherein each elastomer expanse is joined to a pad expanse interposed between said one end of the lever and the distal ends of the leg expanses associated with said lever.
8. The device of claim 6, wherein each lever is an elongate metallic element and includes intermediate its ends a projecting fulcrum which pivotally supports the lever.

* * * * *